United States Patent
Park

(10) Patent No.: US 10,933,543 B2
(45) Date of Patent: Mar. 2, 2021

(54) MULTIPURPOSE SCISSORS

(71) Applicant: Jaeik Park, Daegu (KR)

(72) Inventor: Jaeik Park, Daegu (KR)

(*) Notice: Subject to any disclaimer, the term of this patent is extended or adjusted under 35 U.S.C. 154(b) by 98 days.

(21) Appl. No.: 16/449,553

(22) Filed: Jun. 24, 2019

(65) Prior Publication Data
US 2020/0001478 A1 Jan. 2, 2020

(30) Foreign Application Priority Data
Jun. 29, 2018 (KR) .................... 10-2018-0075390

(51) Int. Cl.
*B26B 13/22* (2006.01)
*A22C 25/00* (2006.01)
*A22C 25/17* (2006.01)
*A47J 42/34* (2006.01)

(52) U.S. Cl.
CPC ............ *B26B 13/22* (2013.01); *A22C 25/006* (2013.01); *A22C 25/17* (2013.01); *A47J 42/34* (2013.01)

(58) Field of Classification Search
CPC ......... B26B 13/22; B26B 13/08; A22C 25/17; A22C 25/006; A47J 42/43
See application file for complete search history.

(56) References Cited

U.S. PATENT DOCUMENTS

| | | | | |
|---|---|---|---|---|
| 4,658,456 A * | 4/1987 | Tsai | ............ | B25B 7/00 7/135 |
| 5,063,671 A * | 11/1991 | Huang | ............ | B25B 7/08 30/262 |
| 5,497,554 A * | 3/1996 | Hamlin | ............ | B25B 7/00 30/317 |
| 8,042,274 B2 * | 10/2011 | Lau | ............ | B26B 13/22 30/123 |
| 8,959,777 B2 * | 2/2015 | Forman | ............ | B26B 13/12 30/146 |
| 2015/0217462 A1 * | 8/2015 | Cotter | ............ | A01G 3/02 30/123 |
| 2015/0283717 A1 * | 10/2015 | Hong | ............ | A22C 25/006 30/146 |
| 2015/0375385 A1 * | 12/2015 | Nix | ............ | B25F 1/003 362/119 |

FOREIGN PATENT DOCUMENTS

KR          10-0617392 B1     8/2006
KR     20-2009-0008356 U      8/2009

* cited by examiner

*Primary Examiner* — David B. Thomas
(74) *Attorney, Agent, or Firm* — KORUS Patent, LLC; Seong Il Jeong

(57) ABSTRACT

Disclosed herein are multipurpose scissors. In the multipurpose scissors, an upper blade and a lower blade are connected by a pivot pin, opposite cutting edges are formed on the upper and lower blades in front of the pivot pin, and upper and lower handles configured to grip the upper and lower blades and to perform cutting work are provided in back of the pivot pin. The multipurpose scissors include a garlic mincing unit, including: a crushing part configured such that pluralities of depressions and protrusions are formed to engage with each other on the friction surfaces of the upper and lower handles; and a discharge guiding part formed on the inner side of the crushing part, and configured such that an inclined guide surface and a discharge groove configured to discharge garlic, minced via the crushing part, in one direction are formed therein.

7 Claims, 10 Drawing Sheets

MULTIPURPOSE SCISSORS

CROSS-REFERENCE TO RELATED APPLICATION

This application claims the benefit of Korean Patent Application No. 10-2018-0075390 filed on Jun. 29, 2018, which is hereby incorporated by reference herein in its entirety.

BACKGROUND

1. Technical Field

The present invention relates generally to multipurpose scissors, and more specifically to multipurpose scissors that are capable of performing a garlic mincing function and a fish scaling function by means of scissors that are used as a kitchen utensil having a cutting means.

2. Description of the Related Art

In general, scissors, which are used as a kitchen utensil, mainly aim at a means for cutting kimchi, kkakdugi, meat, etc. Scissors equipped with an additional function, such as a bottle opener function, are used.

Furthermore, minced garlic is frequently used during the process of cooking food in a kitchen or during the process of directly introducing food materials into a cooking container and then cooking the food materials in a restaurant. In order to use such minced garlic, it is troublesome to crush garlic with the sheath of a knife or to separately purchase a garlic mincing tool.

In view of the above situation, as a conventional technology, Korean Patent No. 10-0617392 discloses multipurpose scissors. The multipurpose scissors include: scissor shanks each configured such that a blade provided with a cutting edge is provided on one side thereof and a handle configured to grip and operate the scissors is provided on the opposite side thereof; and a rivet configured to fasten the scissor shanks so that the scissor shanks are rotatable. A crushing part formed by stacking and mounting one or more plates, having engaging depressions and protrusions, on each of both sides of the scissor shanks between the handles and the rivet is provided, or a crushing part integrated with the scissor shanks is provided. A material is crushed by introducing the material into the crushing part. Furthermore, at least one of the cutting edges of the cutting blades is curved like an S shape, and cuts various materials.

Furthermore, in order to overcome the above situation, Korean Utility Model Application Publication No. 20-2009-0008356 discloses scissors including upper and lower scissor shanks. In order to provide a garlic mincing function, a garlic mincing protrusion is installed in the upper scissor shank, and a garlic mincing depression is provided in the lower scissor shank. Garlic is minced by putting garlic into the garlic mincing depression and then closing the upper and lower scissor shanks, like in the use of scissors, and the minced garlic is taken out from the garlic mincing depression and then used.

Conventional scissors equipped with a garlic mincing function, including the above-described conventional technologies, perform one-time garlic mincing operation in which minced garlic is formed by putting one or two cloves of garlic into a crushing part and then mincing the cloves of garlic, the minced garlic is taken out from the crushing part, and then other one or more cloves of garlic are minced.

Accordingly, the conventional scissors equipped with a garlic mincing function are disadvantageous in that it is burdensome to mince garlic and efficient operation is not performed.

SUMMARY

The present invention has been conceived to overcome the above-described problems, and an object of the present invention is to provide multipurpose scissors which include common scissors including upper and lower blades where opposite cutting edges are formed, in which a garlic mincing unit is formed through the friction surfaces of upper and lower handles, in which the garlic mincing unit includes a crushing part configured such that pluralities of depressions and protrusions are formed to engage with each other and a discharge guiding part formed on one side of the crushing part and configured to allow minced garlic to be collected and discharged, thereby performing continuous garlic mincing via the garlic mincing unit and also discharging minced garlic so that the minced garlic can be conveniently and cleanly introduced to a cooking container.

Another object of the present invention is to provide multipurpose scissors which a back side opposite to one side cutting edge of the upper and lower blades is provided with a fish scaling unit where a plurality of sawtoothed contact surfaces is formed, thereby enabling scales of a fish to be conveniently removed by the sawtoothed contact surfaces.

According to an aspect of the present invention, there is provided multipurpose scissors, in which an upper blade and a lower blade are connected by a pivot pin, opposite cutting edges are formed on the upper and lower blades in front of the pivot pin, and upper and lower handles configured to grip the upper and lower blades and to perform cutting work are provided in back of the pivot pin, the multipurpose scissors including: a garlic mincing unit including: a crushing part configured such that pluralities of depressions and protrusions are formed to engage with each other on the friction surfaces of the upper and lower handles; and a discharge guiding part formed on the inner side of the crushing part, and configured such that an inclined guide surface and a discharge groove configured to discharge garlic, minced via the crushing part, in one direction are formed therein.

The friction surfaces of the upper and lower handles through which the garlic mincing unit is formed may be formed to protrude from the side surfaces of the upper and lower handles.

The crushing part and the discharge guiding part which are formed through the friction surfaces of the upper and lower handles through which the garlic mincing unit is formed may be divided into two sides along the widthwise directions of the upper and lower handles, one of the sides may constitute the crushing part, and the other one of the sides may constitute the discharge guiding part adjoining the crushing part.

The inclined guide surface of the discharge guiding part may be formed at the inner end of the crushing part, and the inclined guide surface of the discharge guiding part may be formed on the lower friction surface of the lower handle.

The inclined guide surface of the discharge guiding part may be formed at the inner end of the crushing part, and the inclined guide surface of the discharge guiding part may be formed on each of the upper and lower friction surfaces of the upper and lower handles.

A back side opposite to one side cutting edge of the upper and lower blades may be provided with a fish scaling unit where a plurality of sawtoothed contact surfaces is formed.

A departure prevention protrusion may be formed in a boundary portion between the discharge guiding part and the upper and lower handles in the form of a partition.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Figure 1:
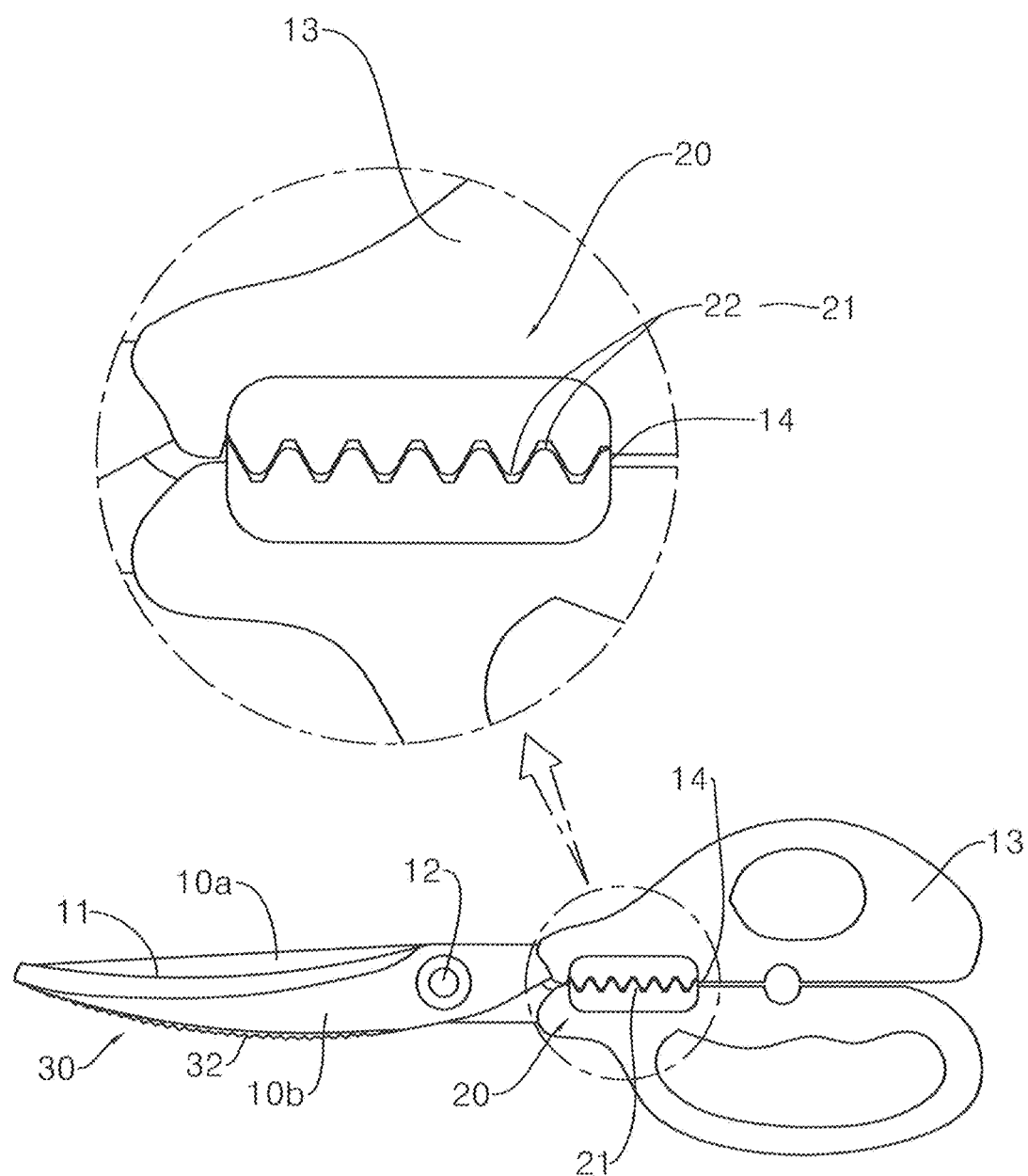
FIG. 1 shows a front view of the configuration of multipurpose scissors according to the present invention and a partially enlarged view of a garlic mincing unit.
Figure 2:
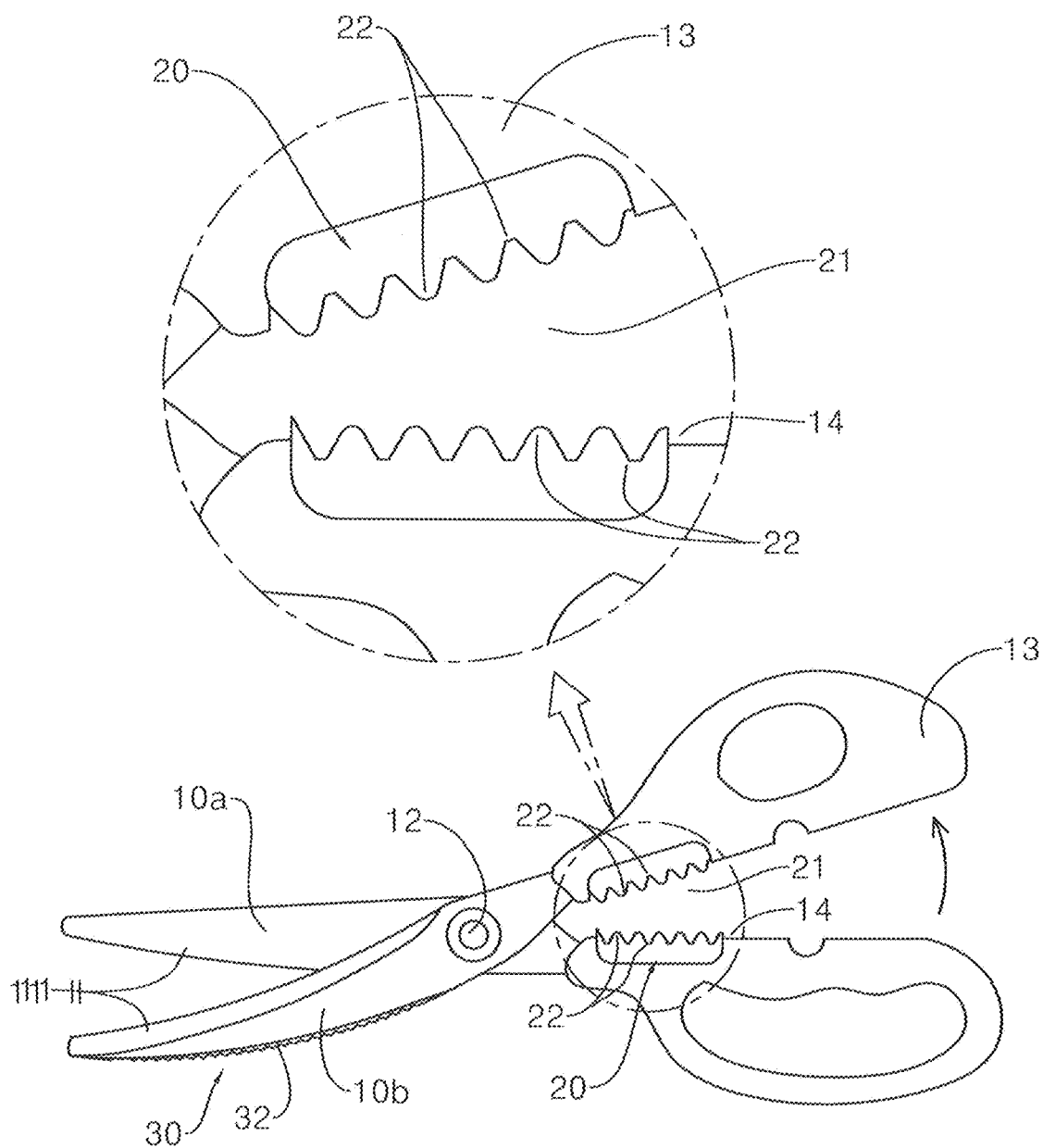
FIG. 2 shows front and partially enlarged views showing a state in which the crushing part of the garlic mincing unit based on the configuration of the multipurpose scissors according to the present invention has been opened.
Figure 3:
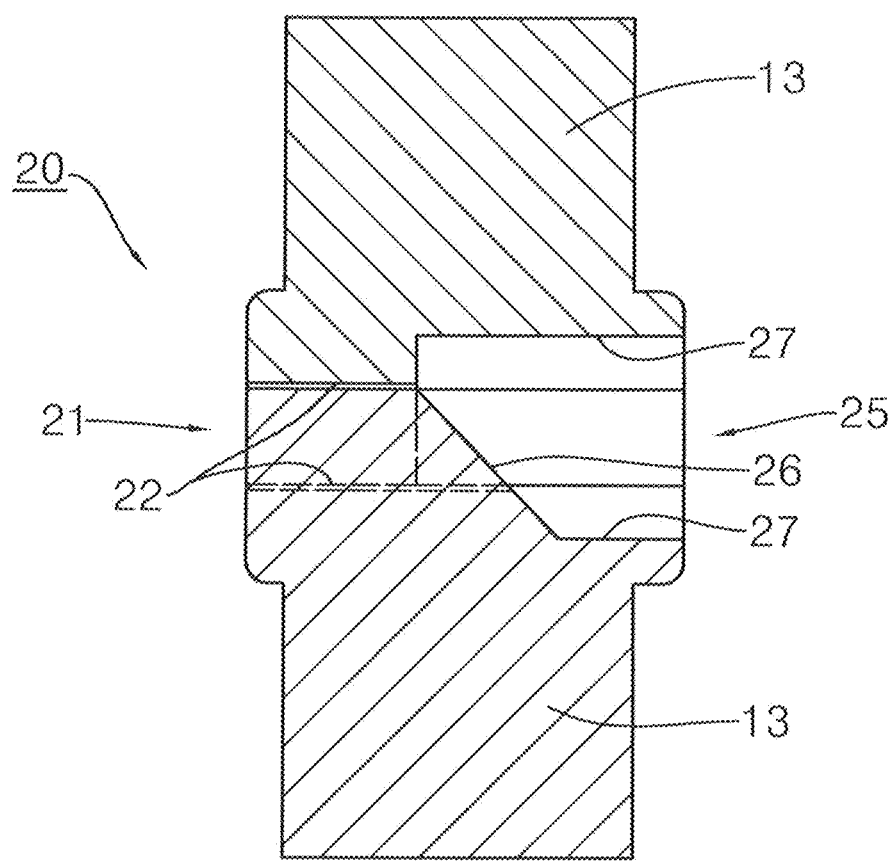
FIG. 3 is a sectional view showing the configuration of the multipurpose scissors according to the present invention.

Preferred embodiments of the present invention will be described in detail below with reference to the accompanying drawings. In the following description of the present invention, when it is determined that a detailed description of a related well-known function or configuration may make the gist of the present invention unnecessarily obscure, it will be omitted.

Multipurpose scissors according to the present invention are configured to perform a garlic mincing function and a fish scaling function as well as a cutting function by means of scissors that are mainly used as a kitchen utensil.

In general, scissors are configured such that an upper blade 10a and a lower blade 10b are connected by a pivot pin 12, opposite cutting edges 11 are formed on the upper and lower blades 10a and 10b in front of the pivot pin 12, and upper and lower handles 13 configured to grip the upper and lower blades 10a and 10b and perform cutting work are provided in back of the pivot pin 12.

According to the present invention, the upper and lower handles 13 are provided with a garlic mincing unit 20, and a back side opposite to one cutting edge 11 of the upper and lower blades 10a and 10b is provided with a fish scaling unit 30.

The garlic mincing unit 20 includes: a crushing part 21 configured such that pluralities of depressions and protrusions 22 are formed to engage with each other on the friction surfaces 14 of the upper and lower handles 13; and a discharge guiding part 25 formed on the inner side of the crushing part 21, and configured such that an inclined guide surface 26 and a discharge groove 27 configured to discharge garlic, minced via the crushing part 21, in one direction are formed therein.

The friction surfaces 14 of the upper and lower handles through which the garlic mincing unit 20 is formed are formed to protrude from the side surfaces of the upper and lower handles 13. The friction surfaces 14 secure a space sufficient to crush garlic and to collect and discharge the crushed garlic. Furthermore, the friction surfaces 14 push garlic into the crushing part 21 and then crush the garlic via the portions protruding in the widthwise directions of the upper and lower handles 13, and allow minced garlic to fall easily without adhering to the upper and lower handles 13, except for the garlic mincing unit 20, during the discharge of minced garlic.

Furthermore, the crushing part 21 and the discharge guiding part 25 that are formed through the friction surfaces 14 of the upper and lower handles 13 through which the garlic mincing unit 20 is formed are divided into two sides along the widthwise directions of the upper and lower handles 13, one of the sides constitutes the crushing part 21, and the other one of the sides constitutes the discharge guiding part 25 adjoining the crushing part 21. Accordingly, garlic minced by the crushing part 21 on one side is discharged through the discharge guiding part 25 on the opposite side.

The inclined guide surface 26 of the discharge guiding part 25 is formed at the inner end of the crushing part 21, and functions to allow garlic, minced by the crushing part 21, to be pushed in the discharge direction of the discharge guiding part 25. The inclined guide surface 26 of the discharge guiding part 25 may be formed only on the lower friction surface 14 of the lower handle 13, or may be formed on each of the upper and lower friction surfaces 14 of the upper and lower handles 13.

When the inclined guide surface 26 of the discharge guiding part 25 is formed on each of the upper and lower friction surfaces 14 of the upper and lower handles 13, not only a right-handed user but also a left-handed user who grips the scissors at different locations is enabled to use the scissors.

Meanwhile, according to the present invention, a back side opposite to one side cutting edge of the upper and lower blades 10a and 10b is provided with the fish scaling unit 30 where a plurality of sawtoothed contact surfaces 32 is formed, and thus scales of a fish can be conveniently removed by the sawtoothed contact surfaces 32.

Figure 7:
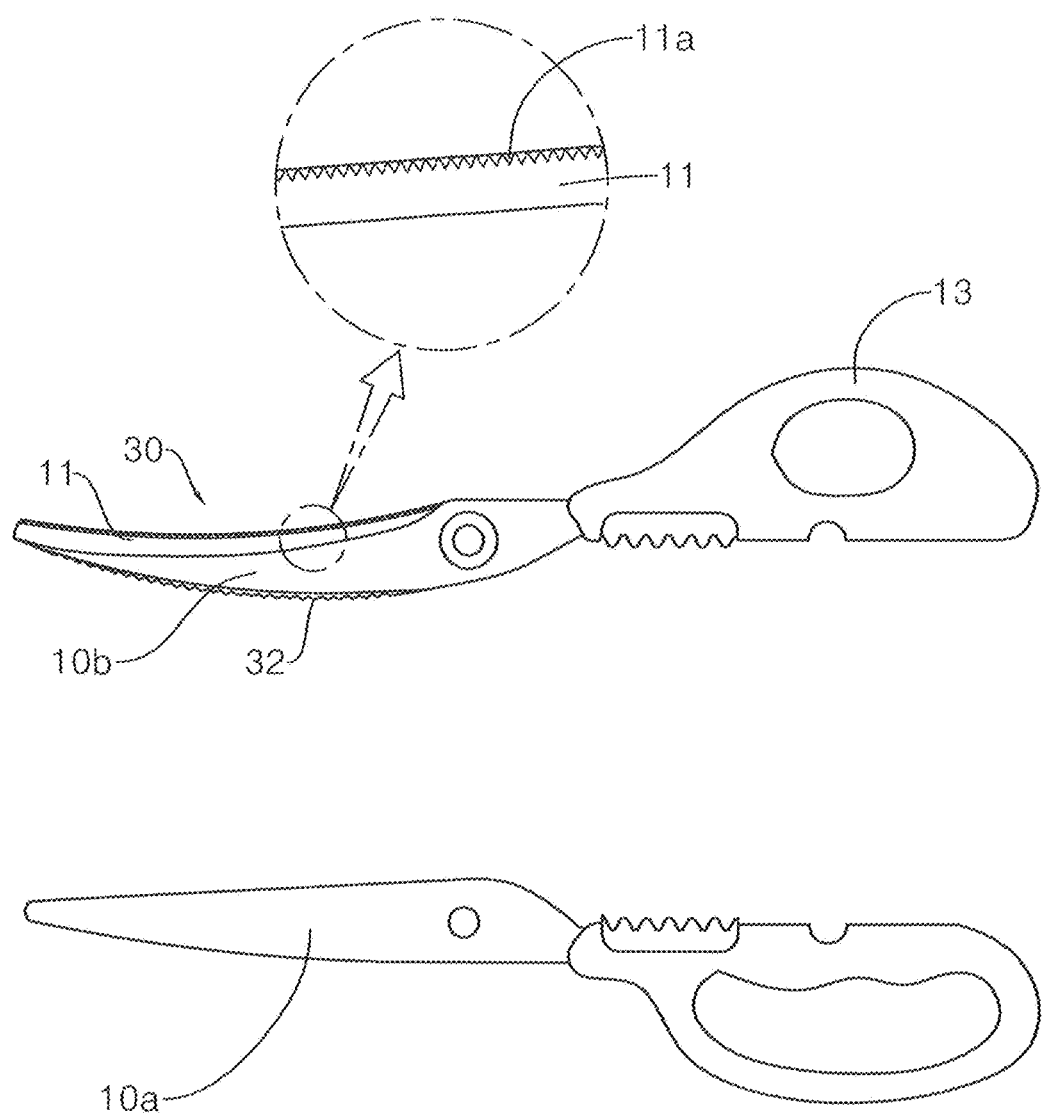
FIG. 7 is an exploded front view showing an example in which one side cutting edge of multipurpose scissors according to the present invention is provided as a sawtoothed cutting edge.
Figure 8:
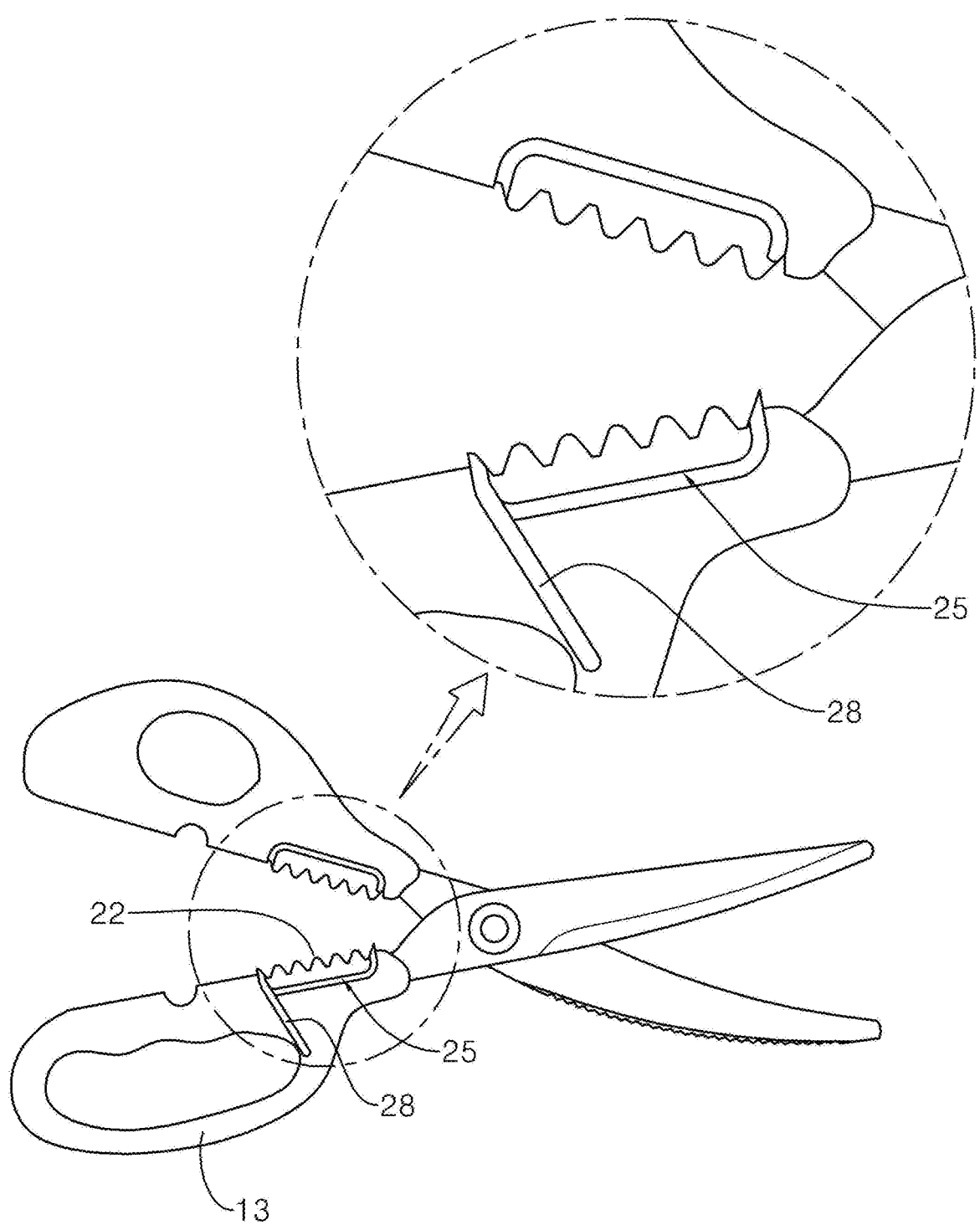
FIG. 8 is a rear view showing an example in which a departure prevention protrusion is provided in a boundary portion between a discharge guiding part and upper and lower handles in multipurpose scissors according to the present invention.
Figure 9:
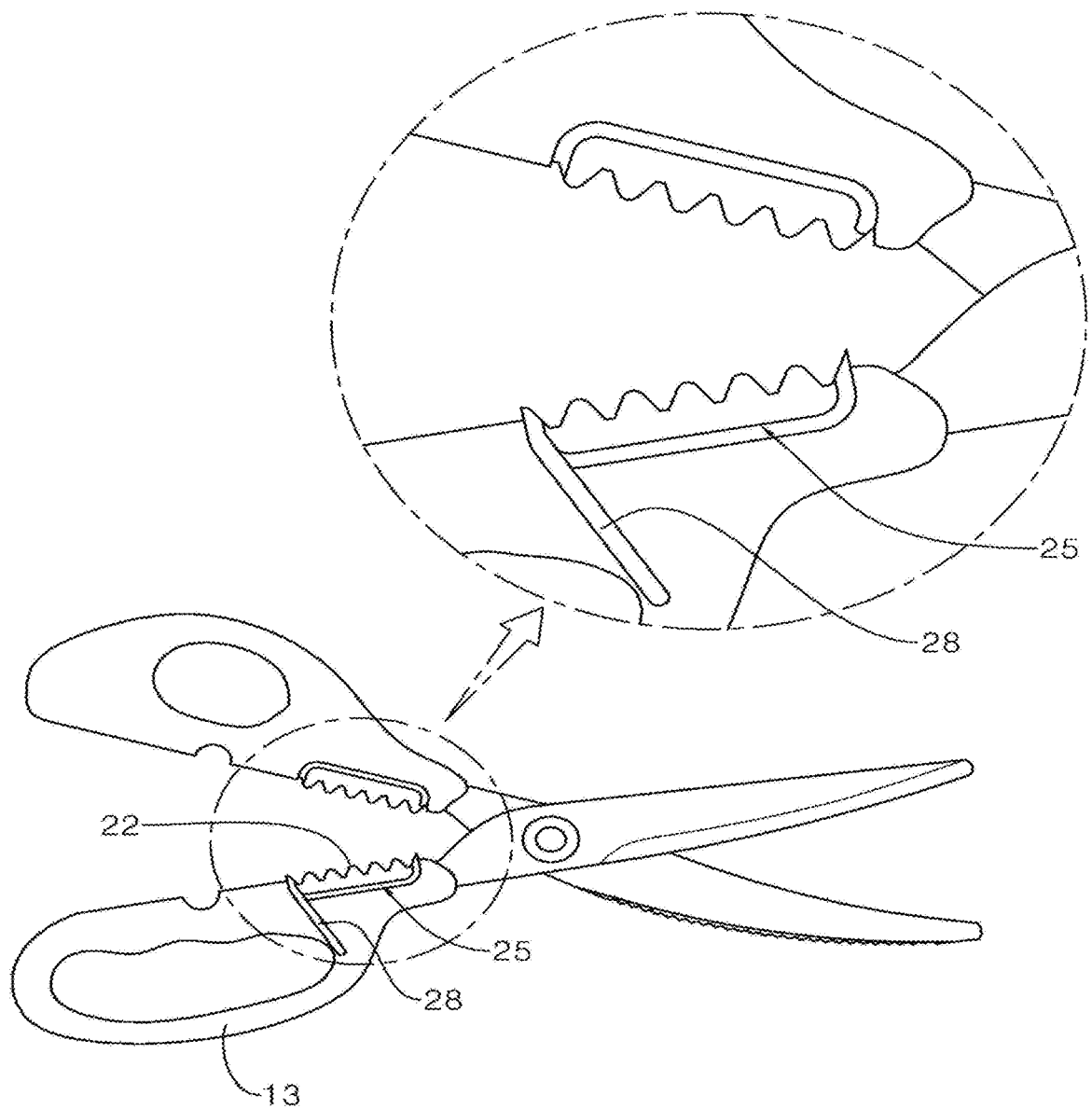
FIG. 9 shows plan and partially enlarged views showing the example in which the departure prevention protrusion is provided in the boundary portion between the discharge guiding part and the upper and lower handles in the multipurpose scissors according to the present invention.
Figure 10:
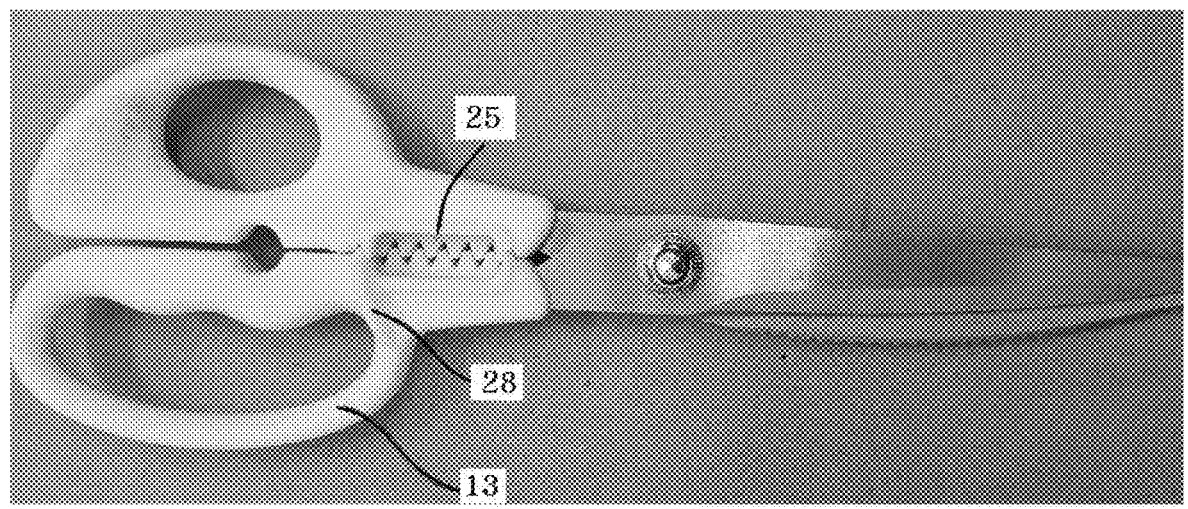
FIG. 10 is a rear photo showing the example in which the departure prevention protrusion is provided in the boundary portion between the discharge guiding part and the upper and lower handles according to the present invention.
Figure 11:
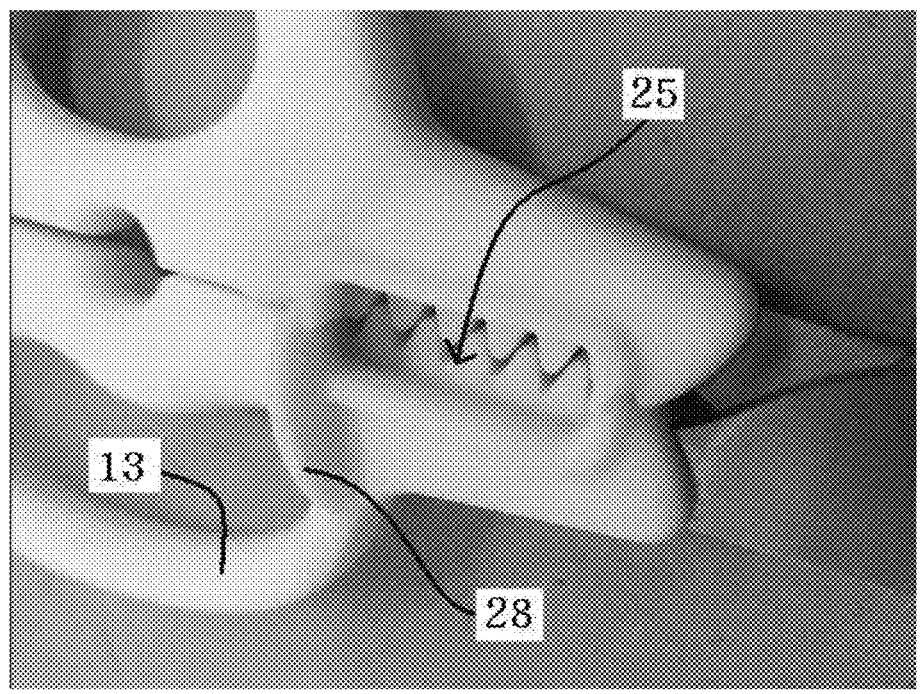
FIG. 11 is a partially enlarged photo showing the example in which the departure prevention protrusion is provided in the boundary portion between the discharge guiding part and the upper and lower handles according to the present invention.

Furthermore, according to the present invention, as shown in FIG. 7, one side cutting edge 11 of the upper and lower blades 10a and 10b is provided as a sawtoothed cutting edge 11a, and thus cutting can be easily performed without sliding when meat or the like is cut with the sawtoothed cutting edge 11a.

As shown in FIGS. 8 to 11, a departure prevention protrusion 28 is formed in a boundary portion between the discharge guiding part 25 and the upper and lower handles 13 according to the present invention in the form of a partition, and guides minced garlic, being discharged through the discharge guiding part 25, through forward discharge without intruding in the directions of the upper and lower handles 13.

In other words, the departure prevention protrusion 28 can prevent garlic minced by the crushing part 21 from intruding in the directions of the upper and lower handles 13 and dirtying a hand of an operator who holds the upper and lower blades 10a and 10b while the minced garlic is being discharged through the discharge guiding part 25.

An embodiment using the above-described multipurpose scissors according to the present invention will be described below.

Figure 4:
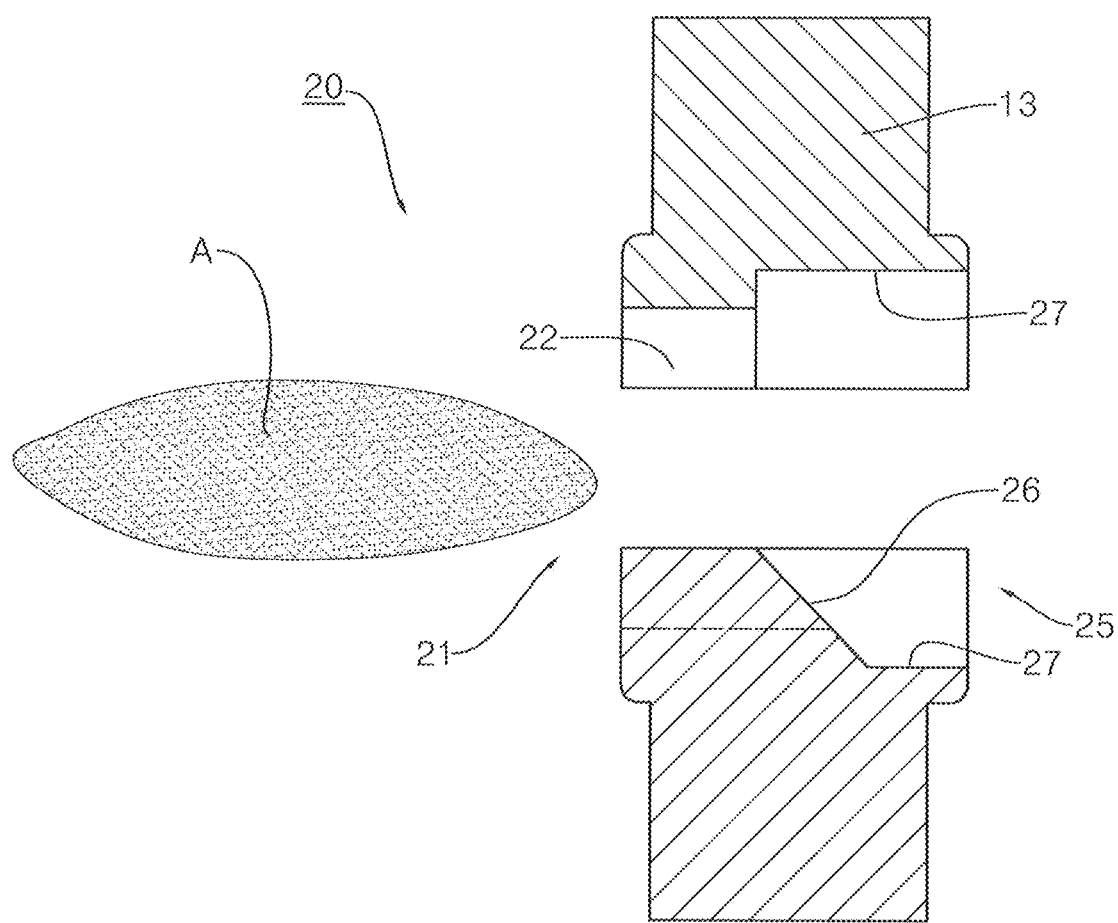
FIG. 4 is a sectional view of an embodiment in which garlic is introduced into the crushing part of the garlic mincing unit in the multipurpose scissors according to the present invention.

FIG. 4 shows a time point at which the mincing of garlic is started via the crushing part 21 of the garlic mincing unit 20, provided on the upper and lower blades 10a and 10b, by means of the multipurpose scissors according to the present invention. When one side of garlic A gripped with a hand is placed on the plurality of depressions and protrusions 22 formed on the friction surfaces 14 of the upper and lower handles 13 in the state in which the friction surfaces 14 of the upper and lower handles 13 have been opened and then the friction surfaces 14 of the upper and lower handles 13 are closed to come into contact with each other, the garlic A is crushed by the depressions and protrusions 22 of the friction surfaces 14, and thus minced garlic B is formed.

When the process of mincing garlic by means of the crushing part 21 of the garlic mincing unit 20 is performed as described above and the garlic A continues to be pushed into the crushing part 21 of the garlic mincing unit 20, the minced garlic B is pushed inward and sent to the discharge guiding part 25.

Figure 5:
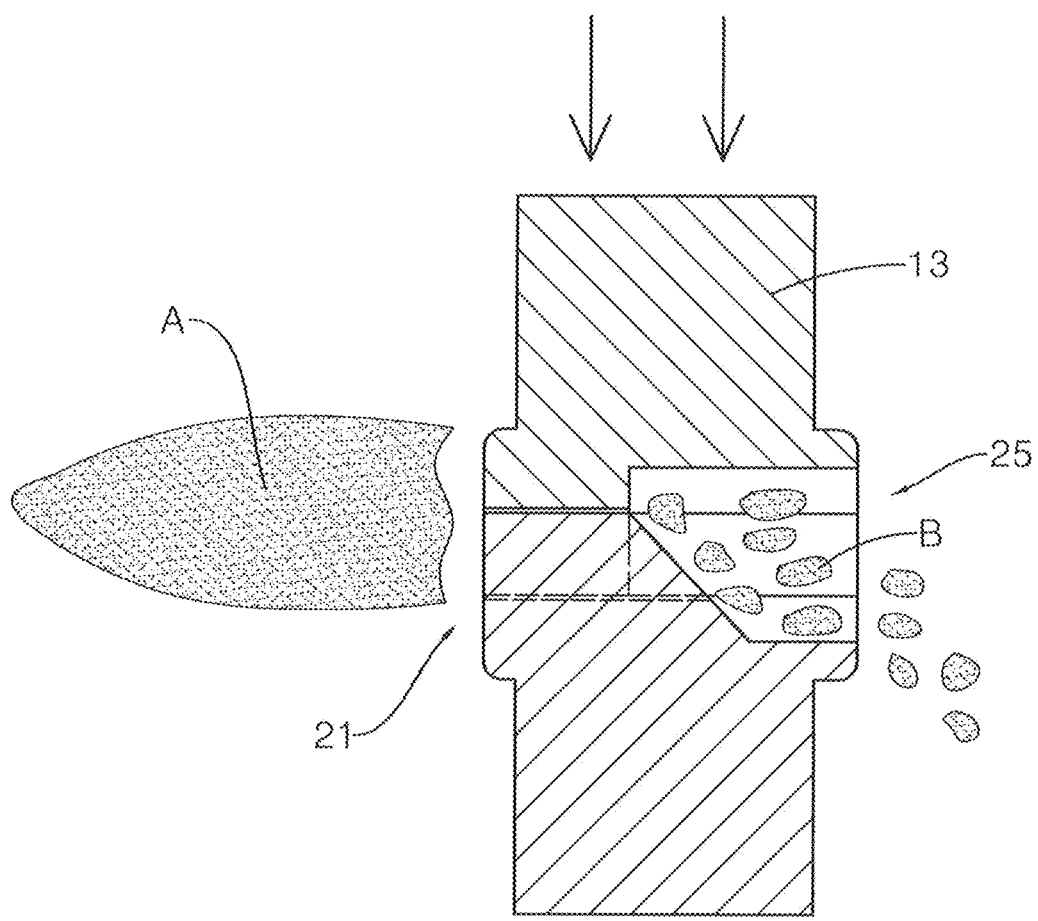
FIG. 5 is a sectional view of an embodiment in which minced garlic is discharged to the discharge guiding part of the garlic mincing unit in the multipurpose scissors according to the present invention.
Figure 6:
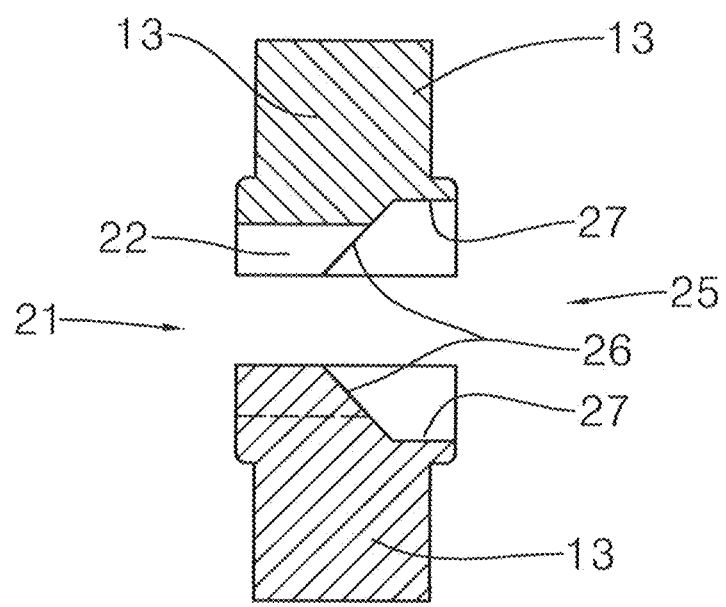
FIG. 6 is a sectional view showing an example in which upper and lower inclined guide surfaces are provided in the discharge guiding part of a garlic mincing unit in multipurpose scissors according to the present invention.

In other words, as shown in FIG. 5, when the garlic minced via the crushing part 21 is sent to the discharge groove 27 along the inclined guide surface 26 of the discharge guiding part 25, the minced garlic B is collected and discharged. During this process, the function of mincing garlic may continue to be performed. The garlic B minced by the garlic mincing unit 20 is collected in the discharge guiding part 25, falls downward, and is introduced into a cooking container without requiring the separate work of taking minced garlic out from the garlic mincing unit 20.

As described above, according to the present invention, the garlic mincing unit 20 provided on the friction surfaces 14 of the upper and lower handles 13 of the scissors includes the crushing part 21 configured to form minced garlic and the discharge guiding part 25 configured to collect and discharge the garlic minced via the crushing part 21, and thus the garlic mincing unit 20 may continue to perform the function of mincing garlic. The garlic minced by the crushing part 21 is easily introduced into a cooking container through a process in which the minced garlic is collected in the discharge guiding part 25, falls and is then discharged.

Furthermore, in the scissors according to the present invention, a back side opposite to one cutting edge 11 of the upper and lower blades 10a and 10b is provided with the fish scaling unit 30 where the plurality of sawtoothed contact surfaces 32 is formed, and thus the function of conveniently removing scales of a fish by means of the sawtoothed contact surfaces 32 during the work of removing scales of a fish as if a user scratched the scales of the fish is performed. Accordingly, multipurpose functions are performed.

In the multipurpose scissors according to the present invention, the garlic mincing unit provided through the friction surfaces of the upper and lower handles includes the crushing part configured to form minced garlic and the discharge guiding part configured to collect and discharge garlic minced via the crushing part, so that a garlic mincing function can be continuously performed and minced garlic can be easily introduced into a cooking container, thereby providing the effects of considerably improving the efficiency of a garlic mincing function and also providing convenient and clean use.

Furthermore, according to the present invention, the back side opposite to one cutting edge of the upper and lower blades is provided with the fish scaling unit where the plurality of sawtoothed contact surfaces is formed, thereby providing the effect of conveniently removing scales of a fish by means of the sawtoothed contact surfaces during the work of removing scales of a fish as if a user scratched the scales of the fish is performed.

Although the present invention has been described with reference to the embodiments above, it will be apparent that various modifications and alterations may be made without departing from the technical spirit of the present invention.

What is claimed is:

1. Multipurpose scissors, in which an upper blade (10a) and a lower blade (10b) are connected by a pivot pin (12), opposite cutting edges (11) are formed on the upper and lower blades (10a and 10b) in front of the pivot pin (12), and upper and lower handles (13) configured to grip the upper and lower blades (10a and 10b) and to perform cutting work are provided in back of the pivot pin (12), the multipurpose scissors comprising:

a garlic mincing unit (20) including: a crushing part (21) configured such that pluralities of depressions and protrusions (22) are formed to engage with each other on friction surfaces (14) of the upper and lower handles (13); and a discharge guiding part (25) formed on an inner side of the crushing part (21), and configured such that an inclined guide surface (26) and a discharge groove (27) configured to discharge garlic, minced via the crushing part (21), in one direction are formed therein.

2. The multipurpose scissors of claim 1, wherein the friction surfaces (14) of the upper and lower handles (13) through which the garlic mincing unit (20) is formed are formed to protrude from side surfaces of the upper and lower handles (13).

3. The multipurpose scissors of claim 1, wherein the crushing part (21) and the discharge guiding part (25) which are formed through the friction surfaces (14) of the upper and lower handles (13) through which the garlic mincing unit (20) is formed are divided into two sides along widthwise directions of the upper and lower handles (13), one of the sides constitutes the crushing part (21), and a remaining one of the sides constitutes the discharge guiding part (25) adjoining the crushing part (21).

4. The multipurpose scissors of claim 1, wherein the inclined guide surface (26) of the discharge guiding part (25) is formed at an inner end of the crushing part (21), and the inclined guide surface (26) of the discharge guiding part (25) is formed on the lower friction surface (14) of the lower handle (13).

5. The multipurpose scissors of claim 1, wherein the inclined guide surface (26) of the discharge guiding part (25) is formed at an inner end of the crushing part (21), and the inclined guide surface (26) of the discharge guiding part (25) is formed on each of the upper and lower friction surfaces (14) of the upper and lower handles (13).

6. The multipurpose scissors of claim 1, wherein a back side opposite to one side cutting edge of the upper and lower blades (10a and 10b) is provided with a fish scaling unit (30) where a plurality of sawtoothed contact surfaces (32) is formed.

7. The multipurpose scissors of claim 1, wherein a departure prevention protrusion (28) is formed in a boundary portion between the discharge guiding part (25) and the upper and lower handles (13) in a partition form.

\* \* \* \* \*